INVENTOR
John H. Rouse
BY
John Flam
HIS ATTORNEY

Patented Aug. 12, 1930

1,772,760

UNITED STATES PATENT OFFICE

JOHN H. ROUSE, OF SAN FRANCISCO, CALIFORNIA, ASSIGNOR TO JOHN H. ROUSE AND WILLIAM FREDERIC KAHN, COPARTNERS, DOING BUSINESS AS R-K MFG. CO., OF SAN FRANCISCO, CALIFORNIA

ELECTRICAL MEASURING INSTRUMENT

Application filed December 12, 1927. Serial No. 239,511.

This invention relates to an instrument for measuring electrical quantities, and particularly to a device that can be used as a voltmeter or as an ammeter.

Potential differences as well as current flow can be measured by the aid of the usual galvanometer. In the first case, the measuring circuit that shunts the circuit under measurement, must have a high resistance to prevent material current flow. In the second case, the instrument measuring the current must be inserted in series with the circuit under measurement, although it may be provided with a low resistance shunt to by-pass at least some of the current round the instrument.

It is also well understood that the range of a voltmeter can be varied by varying the resistance of the measuring circuit; thus the greater the resistance, the smaller the deflection.

In a similar manner, the range of an ammeter can be varied by varying the resistance of its shunt; thus the lower the shunt resistance, the smaller the deflection.

It has been proposed in the past to provide an instrument that can be used either as a voltmeter or as an ammeter of variable range, and this was accomplished by appropriate switching of resistances. It is the object of my invention to make it possible to utilize a common instrument in this manner for both types of measurement, but in such a way that a very simple switching arrangement is necessary to change from one type of measurement to the other.

In fact, it is entirely feasible with my scheme to provide merely a pair of circuit controlling devices such as switches, and by mere manipulation of either device, to cause the instrument to operate either as an ammeter or as a voltmeter.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 1:
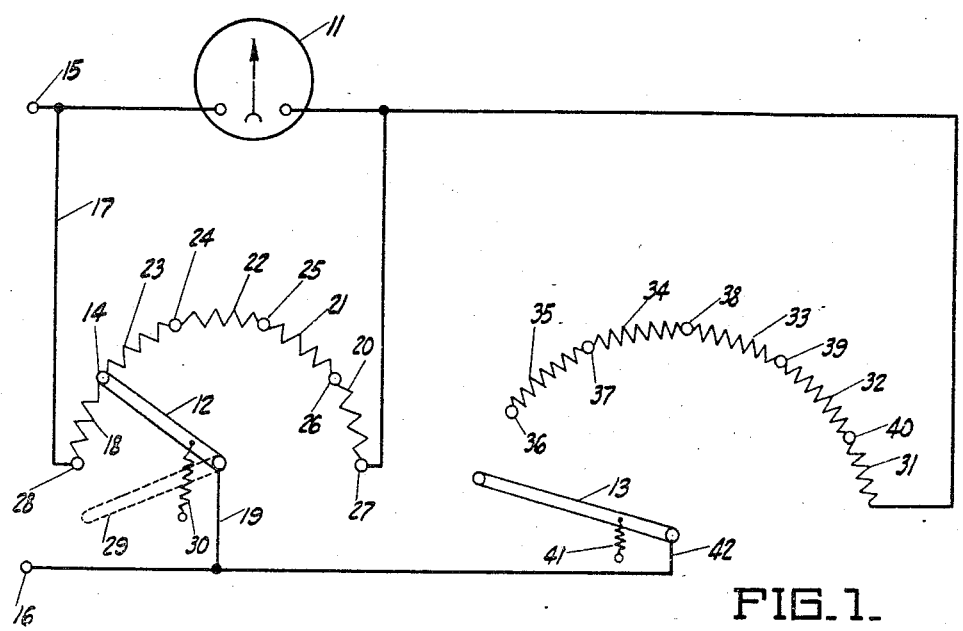
Figure 1 is a wiring diagram of one embodiment of my invention.
Figure 2:
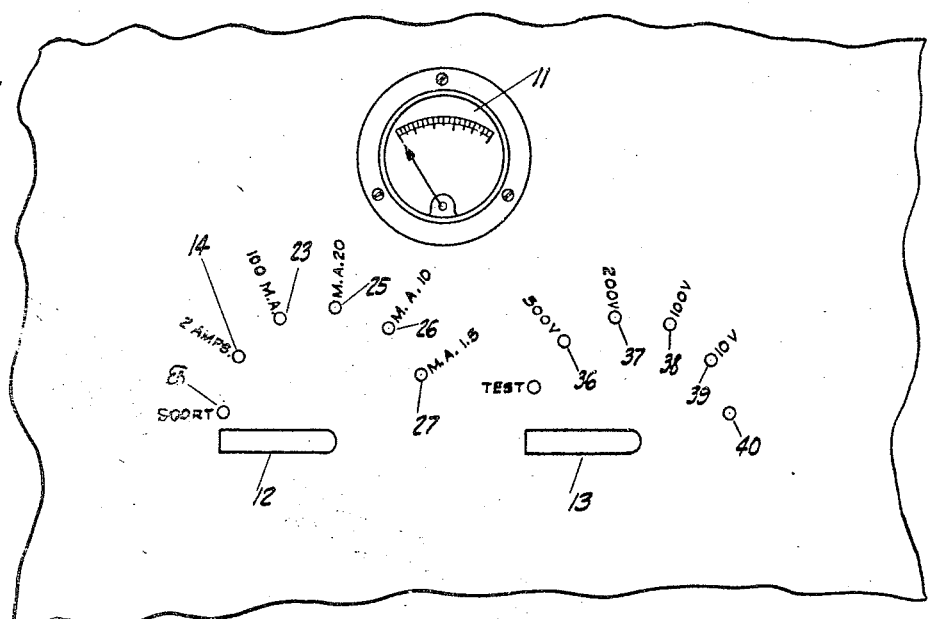
Fig. 2 is a front view of a portion of a panel upon which the instrument is mounted.

A galvanometer 11 is shown as connected to a series of resistances and switches whereby it can serve the dual purpose hereinbefore mentioned. Thus if switch 12 be operated and switch 13 be left in its inactive position, then instrument 11 will indicate current flow. Let us assume for example that switch 12 is in engagement with the first active contact 14. The circuit being measured is presumed to be connected to the posts 15 and 16. This circuit is completed through the connection 17, resistance 18, contact 14, switch 12, connection 19, to post 16. Some current however can flow in shunt to resistance 18 and through instrument 11, in the following path: post 15, instrument 11, resistances 20, 21, 22, and 23, switch 12, connection 19 and post 16.

It is evident that since resistances 18, 23, 22, 21, and 20 are in a closed circuit in shunt to instrument 11, and as switch 12 is moved in succession to tap between any of these resistances, the ratio of the currents flowing in the galvanometer circuit and the other circuit can be varied. Thus if less resistance is included in the galvanometer circuit by say moving arm 12 to contact 24, there is a corresponding increase of resistance in the circuit shunting the galvanometer circuit. In the instance considered, resistance 23 will be taken out of the galvanometer circuit, and will be put into the shunting circuit. Thus the ratio of the current through instrument 11 to the current in the shunt path is increased, and the pointer of the instrument will be deflected further than in the first case.

By proper choice of resistance values, it is possible readily to cause full scale deflection in each case to represent desired values. Thus in the case illustrated, the largest range, corresponding to connection to contact 14, is indicated as 2 amperes; and the range when arm 12 is moved to contact 24 can be 100 milli-amperes. By successive connection to contacts 25, 26, and 27, the full deflection can be made to correspond respectively to 20 milliamperes, 10 milliamperes, and 1.5 milliamperes. Of course these figures are merely illustrative. The extreme left contact 28 corresponds to a short circuiting position for instrument 11, theoretically permitting no current at all to flow through it.

The operation of the device as a multirange ammeter is now clear. It is to be pointed out however that preferably I provide some biasing means for arm 12 such that it automatically returns to the inactive position 29. This can be accomplished by the aid of a spring wound around the pivot of the arm, or by any other equivalent arrangement. I illustrate it diagrammatically by spring 30.

In order to use the device 11 as a voltmeter, a high resistance must be included in circuit therewith. The resistances 18, 20, 21, 22, and 23 can be left permanently connected across the instrument 11, since their combined effect upon the current flow in the instrument is not material and can furthermore be taken care of by proper calibration.

The high resistance for voltmeter operation is provided by a series of resistances 31, 32, 33, 34, and 35. Any number of these can be included in series with the instrument by proper manipulation of arm 13, which is arranged to contact with any one of contacts 36, 37, 38, 39, or 40. It is also provided with a biasing spring 41 that tends to return it to inactive position. Now let us assume that with arm 12 in its inactive position, arm 13 is contacting with contact 36. Under such circumstances, a circuit is completed between posts 15 and 16, through instrument 11 and its shunting resistances, resistances 31, 32, 33, 34, and 35 in series, contact 36, arm 13, and connection 42. This corresponding to the largest range; for example, 500 volts for full scale deflection. Upon moving arm 13 to contact respectively with the succeeding contacts 37, 38, 39, 40, the full scale deflection can be made to correspond to other desired values, such as 200 volts, 100 volts, 10 volts, and 1 volt respectively. Of course the resistances 31 to 35 must be properly chosen to effect this result.

The manner of use of my instrument can now be summarized. If neither switch arm 12 or 13 is operated, they are both in inactive position due to the biasing effect of springs 30 and 41. If it be desired to obtain a current reading, arm 12 is moved to an appropriate contact 14, 24, 25, and 27, and held in that position until a reading is obtained. Then arm 12 is released, and it returns to position 29. If it be desired to obtain a potential difference reading, switch arm 13 is moved to an appropriate contact point 36, 37, 38, 39, or 40, and held in that position until a reading is obtained. Then arm 13 is released, and it returns to inactive position.

It is evident that the manipulation of the system is simple; no tedious shifting of connections is at all required.

I claim:

1. In a combined voltage and current measuring device, an indicating instrument, a series of ohmic resistances permanently shunting said instrument, an ohmic resistance in series therewith, means for completing a circuit through the instrument by connecting to the series of ohmic resistances and separate means for completing a circuit through the instrument by connecting to the series ohmic resistance.

2. The combination as set forth in claim 1, with the provision of means for urging both the completing means to inactive position, whereby each means is ready to be moved for operating the instrument for both current and voltage readings.

3. In a combined voltage and current measuring device, an indicating instrument, an ohmic resistance permanently shunting the instrument, an ohmic resistance in series therewith, and separate means for connecting to the shunting ohmic resistance and to the series ohmic resistance.

4. The combination as set forth in claim 3, with the provision of means for urging both the connecting means to inactive position, whereby each means is ready to be moved for operating the instrument for both current and voltage readings.

5. In a combined voltage and current measuring device, an indicating instrument, a series of ohmic resistances shunting said instrument permanently, a terminal connected to one side of the instrument, a series ohmic resistance connecting to the other side of the instrument, another terminal, and means whereby a connection can be completed to the terminal from the instrument, comprising separate means for either connecting the terminal to any one of the series of shunting ohmic resistances, and for connecting the terminal to the series ohmic resistance.

6. The combination as set forth in claim 5, in which each of the connecting means includes a switch arm and means for urging these arms to inactive position.

7. In a combined multi-range ammeter and multi-range voltmeter, a pair of posts forming the terminals of the meter, an indicating instrument having one side connected to one post, a series of ohmic resistances connected permanently across the instrument, a series ohmic resistance connected to the other side of the instrument, and separate switching means both connected to the other post for connecting said post either to any of a number of points in the series ohmic resistance or to any of a number of points in the shunting ohmic resistances.

8. The combination as set forth in claim 7, in which the switching means includes a pair of switches, one side of each of which is connected to said other post, the other side of one being arranged to coact with the shunting ohmic resistance, and the other side of the other switch being arranged to coact with the series ohmic resistance.

In testimony whereof I have hereunto set my hand.

JOHN H. ROUSE.